United States Patent
Gaur et al.

(10) Patent No.: US 11,589,120 B2
(45) Date of Patent: Feb. 21, 2023

(54) DEEP CONTENT TAGGING

(71) Applicant: Synaptics Incorporated, San Jose, CA (US)

(72) Inventors: Utkarsh Gaur, Millbrae, CA (US); Adil Ilyas Jagmag, Hollis, NH (US); Gaurav Arora, Cupertino, CA (US)

(73) Assignee: Synaptics Incorporated, San Jose, CA (US)

( * ) Notice: Subject to any disclaimer, the term of this patent is extended or adjusted under 35 U.S.C. 154(b) by 0 days.

(21) Appl. No.: 16/799,232

(22) Filed: Feb. 24, 2020

(65) Prior Publication Data

US 2020/0275158 A1 Aug. 27, 2020

Related U.S. Application Data

(60) Provisional application No. 62/809,499, filed on Feb. 22, 2019.

(51) Int. Cl.
*G06F 3/00* (2006.01)
*G06F 13/00* (2006.01)
*H04N 5/445* (2011.01)
*H04N 21/466* (2011.01)
*G06F 3/16* (2006.01)
*H04N 21/475* (2011.01)

(52) U.S. Cl.
CPC ......... *H04N 21/4666* (2013.01); *G06F 3/167* (2013.01); *H04N 21/4755* (2013.01)

(58) Field of Classification Search
CPC . H04N 21/4666; H04N 21/4755; G06F 3/167
See application file for complete search history.

(56) References Cited

U.S. PATENT DOCUMENTS

| | | | |
|---|---|---|---|
| 10,455,297 B1 * | 10/2019 | Mahyar | G10L 15/1815 |
| 2004/0024780 A1 * | 2/2004 | Agnihotri | G11B 27/28 |
| 2013/0330056 A1 * | 12/2013 | Abecassis | H04N 9/8715 386/241 |
| 2014/0219630 A1 * | 8/2014 | Minder | H04N 21/8549 386/241 |
| 2014/0259038 A1 * | 9/2014 | Belyaev | H04N 21/4622 725/14 |
| 2015/0172787 A1 * | 6/2015 | Geramifard | H04N 21/252 725/40 |
| 2017/0272818 A1 * | 9/2017 | Gattis | H04N 21/4415 |
| 2018/0376204 A1 * | 12/2018 | Oswal | G06F 16/78 |
| 2019/0289359 A1 * | 9/2019 | Sekar | H04N 21/4333 |

* cited by examiner

*Primary Examiner* — Mulugeta Mengesha
(74) *Attorney, Agent, or Firm* — Paradice & Li LLP

(57) ABSTRACT

A method and apparatus for deep content tagging. A media device receives one or more first frames of a content item, where the one or more first frames spans a duration of a scene in the content item. The media device detects one or more objects or features in each of the first frames using a neural network model and identifies one or more first genres associated with the first frames based at least in part on the detected objects or features in each of the first frames. The media device further controls playback of the content item based at least in part on the identified first genres.

13 Claims, 8 Drawing Sheets

DEEP CONTENT TAGGING

CROSS-REFERENCE TO RELATED APPLICATION

This application claims priority and benefit under 35 USC § 119(e) to U.S. Provisional Patent Application No. 62/809,499, filed Feb. 22, 2019, which is incorporated herein by reference in its entirety.

TECHNICAL FIELD

The present embodiments relate generally to media content, and specifically to deep-content tagging of media content.

BACKGROUND OF RELATED ART

Machine learning is a technique for improving the ability of a computer system or application to perform a certain task. Machine learning can be broken down into two component parts: training and inferencing. During the training phase, a machine learning system is provided with an "answer" and a large volume of raw data associated with the answer. For example, a machine learning system may be trained to recognize cats by providing the system with a large number of cat photos and/or videos (e.g., the raw data) and an indication that the provided media contains a "cat" (e.g., the answer). The machine learning system may then analyze the raw data to "learn" a set of rules that can be used to describe the answer. For example, the system may perform statistical analysis on the raw data to determine a common set of features (e.g., the rules) that can be associated with the term "cat" (e.g., whiskers, paws, fur, four legs, etc.). During the inferencing phase, the machine learning system may apply the rules to new data to generate answers or inferences about the data. For example, the system may analyze a family photo and determine, based on the learned rules, that the photo includes an image of a cat.

SUMMARY

This Summary is provided to introduce in a simplified form a selection of concepts that are further described below in the Detailed Description. This Summary is not intended to identify key features or essential features of the claims subject matter, nor is it intended to limit the scope of the claimed subject matter.

A method and apparatus for deep content tagging is disclosed. One innovative aspect of the subject matter of this disclosure can be implemented in a method of playing back media content. In some embodiments, the method may include steps of receiving one or more first frames of a content item, where the one or more first frames span a duration of a scene in the content item; detecting one or more objects or features in each of the first frames using a neural network model; identifying one or more first genres associated with the first frames based at least in part on the detected objects or features in each of the first frames; and controlling playback of the content item based at least in part on the identified first genres.

BRIEF DESCRIPTION OF THE DRAWINGS

The present embodiments are illustrated by way of example and are not intended to be limited by the figures of the accompanying drawings.

DETAILED DESCRIPTION

Figure 1:
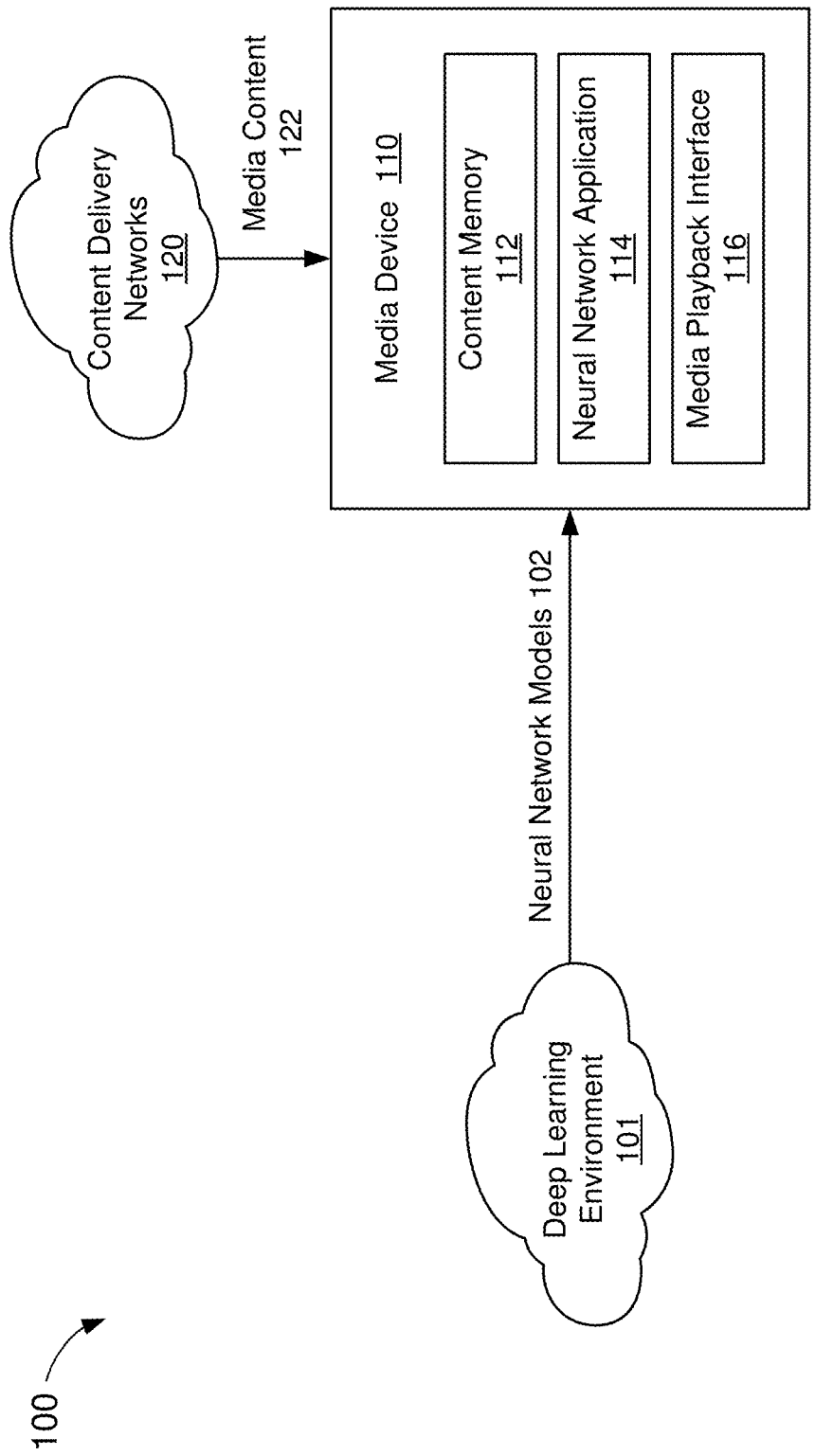
FIG. 1 shows a block diagram of a machine learning system, in accordance with some embodiments.

In the following description, numerous specific details are set forth such as examples of specific components, circuits, and processes to provide a thorough understanding of the present disclosure. The term "coupled" as used herein means connected directly to or connected through one or more intervening components or circuits. Also, in the following description and for purposes of explanation, specific nomenclature is set forth to provide a thorough understanding of the aspects of the disclosure. However, it will be apparent to one skilled in the art that these specific details may not be required to practice the example embodiments. In other instances, well-known circuits and devices are shown in block diagram form to avoid obscuring the present disclosure. Some portions of the detailed descriptions which follow are presented in terms of procedures, logic blocks, processing and other symbolic representations of operations on data bits within a computer memory. The interconnection between circuit elements or software blocks may be shown as buses or as single signal lines. Each of the buses may alternatively be a single signal line, and each of the single signal lines may alternatively be buses, and a single line or bus may represent any one or more of a myriad of physical or logical mechanisms for communication between components.

Unless specifically stated otherwise as apparent from the following discussions, it is appreciated that throughout the present application, discussions utilizing the terms such as "accessing," "receiving," "sending," "using," "selecting," "determining," "normalizing," "multiplying," "averaging," "monitoring," "comparing," "applying," "updating," "measuring," "deriving" or the like, refer to the actions and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The techniques described herein may be implemented in hardware, software, firmware, or any combination thereof, unless specifically described as being implemented in a specific manner. Any features described as modules or components may also be implemented together in an integrated logic device or separately as discrete but interoperable logic devices. If implemented in software, the techniques may be realized at least in part by a non-transitory computer-readable storage medium comprising instructions that, when executed, performs one or more of the methods described above. The non-transitory computer-readable storage medium may form part of a computer program product, which may include packaging materials.

The non-transitory processor-readable storage medium may comprise random access memory (RAM) such as synchronous dynamic random access memory (SDRAM), read only memory (ROM), non-volatile random access memory (NVRAM), electrically erasable programmable read-only memory (EEPROM), FLASH memory, other known storage media, and the like. The techniques additionally, or alternatively, may be realized at least in part by a processor-readable communication medium that carries or communicates code in the form of instructions or data structures and that can be accessed, read, and/or executed by a computer or other processor.

The various illustrative logical blocks, modules, circuits and instructions described in connection with the embodiments disclosed herein may be executed by one or more processors. The term "processor," as used herein, may refer to any general-purpose processor, conventional processor, controller, microcontroller, and/or state machine capable of executing scripts or instructions of one or more software programs stored in memory. The term "media device," as used herein, may refer to any device capable of providing an adaptive and personalized user experience. Examples of media devices may include, but are not limited to, personal computing devices (e.g., desktop computers, laptop computers, netbook computers, tablets, web browsers, e-book readers, and personal digital assistants (PDAs)), data input devices (e.g., remote controls and mice), data output devices (e.g., display screens and printers), remote terminals, kiosks, video game machines (e.g., video game consoles, portable gaming devices, and the like), communication devices (e.g., cellular phones such as smart phones), media devices (e.g., recorders, editors, and players such as televisions, set-top boxes, music players, digital photo frames, and digital cameras), and the like.

FIG. 1 shows a block diagram of a machine learning system 100, in accordance with some embodiments. The system 100 includes a deep learning environment 101 and a media device 110. The deep learning environment 101 may include memory and/or processing resources to generate or train one or more neural network models 102. In some embodiments, the neural network models 102 may be stored and/or implemented (e.g., used for inferencing) on the media device 110. For example, the media device 110 may use the neural network models 102 to determine genre information about media content that may be rendered or played back by the media device 110.

The media device 110 may be any device capable of capturing, storing, and/or playing back media content. Example media devices include set-top boxes (STBs), computers, mobile phones, tablets, televisions (TVs) and the like. The media device 110 may include a content memory 112, a neural network application 114, and a media playback interface 116. The content memory 112 may store or buffer media content (e.g., images, video, audio recordings, and the like) for playback and/or display on the media device 110 or a display device (not shown for simplicity) coupled to the media device 110. In some embodiments, the media device 110 may receive media content 122 from one or more content delivery networks (CDNs) 120. For example, the media content 122 may include television shows, movies, and/or other media content created by a third-party content creator or provider (e.g., television network, production studio, streaming service, and the like). In some aspects, the media content 122 may be requested by, and provided (e.g., streamed) to, the media device 110 in an on-demand manner.

In some implementations, the media device 110 may store or buffer the media content 122 in the content memory 112 for playback. In some aspects, the content memory 112 may operate as a decoded video frame buffer that stores or buffers the (decoded) pixel data associated with the media content 122 to be rendered or displayed by the media device 110. In some other implementations, the content memory 112 may operate as a decoded audio buffer that stores or buffers the decoded audio data associated with the media content 122 to be output or played back by the media device 110.

It is noted that many forms of live, interactive, or prerecorded media content (e.g., movies, television shows, video games, music, and the like) may be categorized into one or more genres or classifications (e.g., action, horror, comedy, science fiction, drama, reality, country, hip hop, rock and roll, etc.). Aspects of the present disclosure recognize that some content items may include elements or characteristics that are classically associated with multiple different genres. However, many content items are categorically labeled under a single genre (e.g., by the creator, producer, and/or distributor of the content). For example, many superhero movies contain elements of action, drama, and comedy, but are often labeled as science fiction and/or fantasy. Thus, searching a media device or content library for "action movies" may not return such superhero movies in the search results.

In some embodiments, the media device 100 may attribute genre classifications to the media content 122 on a scene-by-scene basis. For example, a superhero movie may contain a first scene with loud noises, explosions, and fast-moving objects followed by a second scene that is much quieter with stationary actors engaged in laughter. Accordingly, the media device 100 may label the first scene as an "action" scene or sequence and may further label the second scene as a "comedy" scene or sequence. More specifically, the media device 100 may attribute multiple genres of media content to the same content item based, at least in part, on the characteristics of each scene.

The media device 110 may use neural network models 102 to detect and/or identify one or more genres associated with the received media content 122. In some aspects, the neural network models 102 may be trained to detect one or more pre-defined genres or classifications of media content. For example, horror movies often contain scenes with blood, screams, and/or tense music. On the other hand, romantic comedies often contain scenes with bright colors, lengthy dialogue, and/or uplifting music. The neural network models 122 may be trained on a large dataset of pre-identified genre sequences to recognize the various elements and/or characteristics that uniquely define a particular genre of media content.

The deep learning environment 101 may be configured to generate the neural network models 102 through deep learning. Deep learning is a particular form of machine learning in which the training phase is performed over multiple layers, generating a more abstract set of rules in each successive layer. Deep learning architectures are often referred to as artificial neural networks due to the way in which information is processed (e.g., similar to a biological nervous system). For example, each layer of the deep learning architecture may be composed of a number of artificial neurons. The neurons may be interconnected across the various layers so that input data (e.g., the raw data) may be passed from one layer to another. More specifically, each layer of neurons may perform a different type of transformation on the input data that will ultimately result in a desired output (e.g., the answer). The interconnected framework of neurons may be referred to as a neural network model. Thus, the neural network models 102 may include a set of rules that can be used to describe a particular category or genre of content such as, for example, action, comedy, horror, and the like.

The deep learning environment 101 may have access to a large volume of raw data and may be trained to recognize a set of rules (e.g., certain objects, features, a quality of service, such as a quality of a received signal or pixel data, and/or other detectable attributes) associated with the raw data. For example, in some aspects, the deep learning environment 101 may be trained to recognize action movies. During the training phase, the deep learning environment 101 may process or analyze a large number of images and/or videos corresponding to "action" sequences. The deep learning environment 101 may also receive an indication that the provided media contains an action sequence (e.g., in the form of user input from a user or operator reviewing the media and/or data or metadata provided with the media). The deep learning environment 101 may then perform statistical analysis on the images and/or videos to determine a common set of features associated with the action genre. In some aspects, the determined features (or rules) may form an artificial neural network spanning multiple layers of abstraction.

The deep learning environment 101 may provide the learned set of rules (e.g., as the neural network models 102) to the media device 110 for inferencing. It is noted that, when detecting genre information in live or streaming media on an embedded device, it may be desirable to reduce the inference time and/or size of the neural network. For example, fast inferencing may be preferred (e.g., at the cost of accuracy) when detecting genre information in real-time. Thus, in some aspects, the neural network models 102 may comprise compact neural network architectures (including deep neural network architectures) that are more suitable for inferencing on embedded devices.

In some aspects, one or more of the neural network models 102 may be provided to (e.g., and stored on) the media device 110 at a device manufacturing stage. For example, the media device 110 may be pre-loaded with the neural network models 102 prior to being shipped to an end user. In some other aspects, the media device 110 may receive one or more of the neural network models 102 from the deep learning environment 101 at runtime. For example, the deep learning environment 101 may be communicatively coupled to the media device 110 via a network (e.g., the cloud). Accordingly, the media device 110 may receive the neural network models 102 (including updated neural network models) from the deep learning environment 101, over the network, at any time.

The neural network application 114 may be configured to generate one or more inferences about the media content 122. For example, in some aspects, the neural network application 114 may analyze the media content 122 to infer or identify one or more genres (e.g., action, comedy, horror, and the like) associated with each content item. In some embodiments, the neural network application 114 may generate the inferences based on the neural network models 102 provided by the deep learning environment 101. For example, during the inferencing phase, the neural network application 114 may apply the neural network models 102 to the media content 122 stored in the content memory 112, by traversing the artificial neurons in the artificial neural network, to infer genre information about the media content 122. In some embodiments, the neural network application 114 may further store the inferences (e.g., genre mappings) along with the media content 122 in the content memory 112. It is noted that, by generating the inferences locally on the media device 110, the present embodiments may be used to perform machine learning on media content in a manner that protects user privacy and/or the rights of content providers.

In some embodiments, the neural network application 114 may use the media content stored or buffered in the content memory 112 to perform additional training on the neural network models 102. For example, the neural network application 114 may refine the neural network models 102 and/or generate new neural network models based on the media content stored or buffered in the content memory 112. In some aspects, the neural network application 114 may provide the updated neural network models to the deep learning environment 101 to further refine the deep learning architecture. In this manner, the deep learning environment 101 may further refine its neural network models 102 based on the media content stored on the media device 110 (e.g., combined with media content stored on various other media devices) without receiving or having access to the raw data corresponding to the actual media content.

Aspects of the present disclosure recognize that content providers and/or creators may restrict the sharing or distribution of premium media content (e.g., under "premium content protection" or Digital Rights Management (DRM) laws and regulations). Thus, premium media content may be stored in a secure repository on the media device 110 (e.g., in a trusted environment). The secure repository may be virtually and/or physically partitioned form the rest of the media device 110 such that only applications and/or hardware residing within the trusted environment may have access to the data stored in the secure repository. In some aspects, the secure repository may be formed at least in part within the content memory 112. Any hardware and/or applications operating outside the trusted environment may be restricted from accessing the data stored in the secure repository, whereas hardware and/or applications within the trusted environment may have very limited (if any) communication with the outside world.

In some embodiments, the neural network application 114 may reside, at least in part, within a trusted environment of the media device 110. Placing the neural network application 114 within the trusted environment enables the neural network application 114 to perform machine learning on protected media content (e.g., premium media content) that would otherwise be inaccessible to conventional neural network applications. For example, the neural network application 114 may access full-frame pixel data that can be used to render or display various television shows and/or movies that the user watches on the media device 110. As a result, the neural network application 114 may generate more accurate inferences about the genres associated with each content item stored in the content memory 112.

The media playback interface 116 may provide an interface through which the user can operate, interact with, or otherwise use the media device 110. In some aspects, the media playback interface 116 may enable a user to browse a content library stored on (or accessible by) the media device 110 based, at least in part, on the genre information generated by the neural network application 114. For example, the media playback interface 116 may display recommendations to a user of the media device 100 based on the user's preferences and/or past viewing behavior. In some embodiments, the recommendations may be based, at least in part, on locally-generated genre information (e.g., by the neural network application 114) about the user's previously-viewed media content and/or other media content available in the content library. Thus, if the user has a preference for action movies, the media playback interface 116 may recommend other media content categorized under the action genre and/or containing action scenes or sequences (including media content that may not be categorized under the action genre).

In some other aspects, the media playback interface 116 may enable a user to control the playback of media content based, at least in part, on the genre information generated by the neural network application 114. For example, the media playback interface 116 may display a graphical user interface through which a user of the media device 100 may select a particular content item and/or scene for playback. In some embodiments, each content item and/or scene may be tagged or labeled with one or more associated genres using locally-generated genre information (e.g., by the neural network application 114). Thus, a user who wishes to watch only the action sequences in a particular movie may select (or skip to) each scene of the movie that is identified to contain an action sequence.

Still further, in some aspects, the media playback interface 116 may edit or modify selected media content based, at least in part, on the genre information generated by the neural network application 114. In some embodiments, the media playback interface 116 may dynamically insert other media (e.g., advertisements) into the timeline of the selected media content. For example, to avoid interrupting the flow of media content, the media playback interface 116 may selectively insert advertisements during transitions between different genres (e.g., from an action scene to a comedy scene). In some other embodiments, the media playback interface 116 may dynamically control the content of selected media based, at least in part, on the user's preferences. For example, if a user does not wish to view scenes containing objectionable content (e.g., violence, gore, horror nudity, sex, etc.), the media playback interface 116 may dynamically alter the media content to avoid exposing the user to such objectionable content. In another example, the media payback interface 116 may implement parental controls to dynamically tailor the media content for users belonging to a particular age group or demographic (e.g., children).

In some aspects, the media playback interface 116 may dynamically control the content of selected media by blocking out the objectionable content (e.g., muting the audio content, blacking out the video content, suppressing the subtitles, etc.). In some other aspects, the media playback interface 116 may dynamically control the content of selected media by skipping over scenes containing objectionable content (e.g., jumping to the next scene, in the timeline, that does not contain objectionable content). In some other aspects, the media playback interface 116 may dynamically control the content of selected media by obfuscating scenes containing objectionable content (e.g., blurring the video content, reducing the audio volume, muting or "bleeping" out the audio content, etc.). Still further, in some aspects, the media playback interface 116 may dynamically control the content of selected media by replacing or substituting the objectionable content with alternative ("safe") content.

Accordingly, the media device 110 provide a user with more targeted recommendations based on the user's indicated and/or inferred genre preferences. The media device 110 may also provide an improved viewing experience, for example, by allowing the user to select certain scenes for playback based the user's genres of interest and/or limiting the user's exposure to objectionable content when playing back the content item. The genre-based dynamic content editing allows a user to enjoy media content in a manner that is more custom-tailored to the user's preferences. For example, a user that only wishes to view martial arts fights may be presented with a continuous stream of martial arts action scenes from one or more movies and/or television shows. On the other hand, a user that is sensitive to blood and gore (such as a child) may still enjoy action movies and/or television shows with only the blood and gore content edited out.

Figure 2:
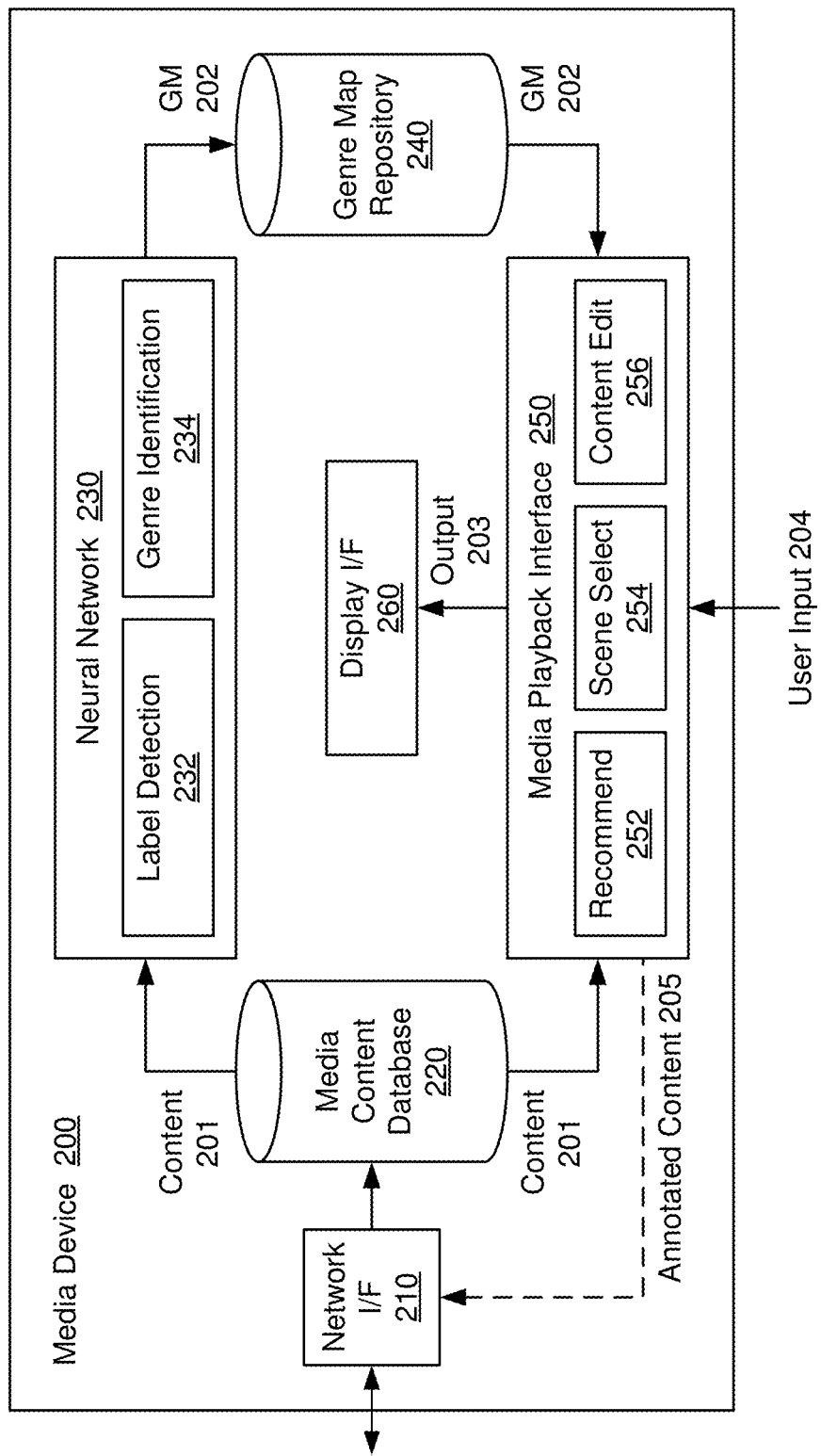
FIG. 2 shows a block diagram of a media device, in accordance with some embodiments.

FIG. 2 shows a block diagram of a media device 200, in accordance with some embodiments. The media device 200 may be an example embodiment of the media device 110 of FIG. 1. The media device 200 includes a network interface (I/F) 210, a media content database 220, a neural network 230, a genre map repository 240, a media playback interface 250, and a display interface 260.

The network interface 210 is configured to receive media content items 201 from one or more content delivery networks. In some aspects, the content items 201 may include audio and/or video associated with live, interactive, or pre-recorded media content (e.g., movies, television shows, video games, music, and the like). More specifically, the content items 201 may be categorized into one or more genres or classifications (e.g., action, horror, comedy, science fiction, drama, reality, country, hip hop, rock and roll, etc.).

The received content items 201 are stored or buffered in the media content database 220. In some embodiments, the media content database 220 may store or buffer the content items 201 for subsequent (or immediate) playback. For example, in some aspects, the content database 220 may operate as a decoded video frame buffer that stores or buffers the (decoded) pixel data associated with the content items 201 to be rendered or displayed by the media device 200 or a display coupled to the media device 200 (not shown for simplicity).

The neural network 230 is configured to generate one or more inferences about the content items 201 stored in the media content database 220. For example, the neural network 230 may be an embodiment of the neural network application 114 of FIG. 1. Thus, the neural network 230 may generate inferences about the content items 201 using one or more neural network models stored on the media device 200. For example, as described with respect to FIG. 1, the neural network 230 may receive trained neural network models (e.g., from the deep learning environment 101) prior to receiving the content items 201. In some embodiments, the neural network 230 may include a label detection module 232 and a genre identification module 234.

The label detection module 232 may detect one or more elementary labels associated with the content items 201. An elementary label may correspond to any object, feature, or characteristic that can be used to identify a particular genre of media content. For example, horror movies often contain scenes with blood, screams, and/or tense music. Thus, in order to identify a scene as a horror scene, the label detection module 232 may be configured to detect blood (e.g., from received video frames), screams (e.g., from received video and/or audio frames), and tense music (e.g., from receive audio frames) in the received content items 201. In some embodiments, the label detection module 232 may implement one or more neural network models that have been trained to detect or identify one or more objects, features, or characteristics associated with one or more pre-defined genres of media content.

The genre identification module 234 may identify one or more genres associated with each content item 201 based, at least in part, on the elementary labels generated by the label detection module 232 and/or additional information (e.g., metadata) provided with the content items 201. As described above, a unique combination of elementary labels (e.g., blood, screams, tense music, etc.) may describe a particular genre of media content (e.g., horror). However, the set of elementary labels associated with two different genres may not be mutually exclusive. For example, blood is a feature that is commonly associated with action and horror genres. Thus, in some instances, multiple genres may be inferred from the elementary labels associated with a given set of frames.

In some embodiments, the genre identification module 234 may select the best match among the possible genres that may be identified from the set of elementary labels. For example, if five elementary labels (from a given set of frames and/or scene) match the horror genre whereas only two elementary labels match the action genre, the genre identification module 234 may label the scene as a horror scene. In some aspects, the genre identification module 234 may use additional information (e.g., metadata) to select the best match. For example, if the scene contains actors that are well-known for action roles (and/or not known to be in any horror movies), the genre identification module 234 may label the scene as an action scene. In some other embodiments, the genre identification module 234 may associate multiple genres with any given scene. For example, if five elementary labels (from a given set of frames and/or scene) match the horror genre and two elementary labels match the action genre, the genre identification module 234 may label the scene as a horror scene and as an action scene.

It is noted that the content genres have been described in the context of movies (or television shows) for example purposes only. In actual implementations, the neural network 230 may be configured to perform deep content tagging in various forms of media (e.g., by identifying one or more content genres associated with individual portions or segments of the media). For example, a particular timbre or type of musical instrument may be used to identify a particular genre of music or audio recording (e.g., banjos are traditionally associated with country music, synthesizers are heavily used in electronic music, electric guitars are often symbolic of rock and roll, etc.). Thus, in some embodiments, the label detection module 232 may be configured to detect characteristics and/or features associated with various genres of music (e.g., using trained neural network models), and the genre identification module 234 may be configured to identify the genre of music associated with various portions of a song or audio recording based on the detected characteristics and/or features.

In some embodiments, the neural network 230 may generate a genre map 202 for each received content item 201. The genre map 202 may identify one or more genres associated with a particular content item 201. In some aspects, the genre map 202 may include a listing of each genre detected in the content item 201. In some other aspects, the genre map 202 may provide a scene-by scene genre breakdown of the content item 201. For example, the genre map 202 may include a listing of one or more scenes (e.g., in the form of a timeline) detected in the content item 201 and an indication of one or more genres associated with each scene.

The genre maps 202 are stored or buffered in the genre map repository 240. In some embodiments, the genre map repository 240 may be categorized or indexed based on the content items 201 stored in the media content database 220. For example, each layer of the genre map repository 240 may store the genre map 202 for a different content item 201 stored in the media content database 220. In some other embodiments, the genre map repository 240 may be included in (or part of) the media content database 220. For example, the genre maps 202 may be stored in association with the content items 201 from which they are derived.

The media playback interface 250 is configured to render the content items 201 for display while providing a user interface through which the user may control, navigate, or otherwise manipulate playback of the content items 201 based, at least in part, on the genre maps 202. For example, the media playback interface 250 may generate an interactive output 203 based on the content items 201 and genre maps 202. The output 203 may be displayed, via the display interface 260, on a display (not shown for simplicity) coupled to or provided on the media device 200. In some aspects, the output 203 may include at least a portion of a content item 201 selected for playback. More specifically, the portion of the content item 201 included in the output 203 may be dynamically selected and/or updated based, at least in part, on user inputs 204 received by the media playback interface 250.

In some embodiments, the media playback interface 250 may associate the user inputs 204 with genre maps 202 to determine the portion of the content item 201 to be included in the output 203. For example, if the user input 204 includes a search for action movies, the media playback interface 250 may display one or more portions of a content item 201, or recommendations for content items 201, that contain action sequences or scenes (e.g., as determined based on the genre maps 202). In some aspects, the media playback interface 250 may include a recommendation module 252, a scene selection module 254, and a content editing module 256.

The recommendation module 252 may recommend media content for a user of the media device 200 based, at least in part on the genre maps 202 stored in the genre map repository 240. For example, the recommendations may be based on the user's preferences (e.g., provided via user inputs 204) and/or past viewing behavior, and may be displayed to the user via the output 203. In some embodiments, the recommendation module 252 may recommend content items 201 determined to have an overall genre match. For example, if the genre map 202 for a particular content item 201 includes more action scenes than scenes associated with any other genre, the recommendation module 252 may broadly categorize the content item 201 under the action genre. Thus, when the user is determined to have a preference for the action genre, the recommendation module 252 may return content items that predominantly contain action scenes (e.g., as determined based on the genre maps 202).

In some other embodiments, the recommendation module 252 may recommend any content items 201 determined to have one or more scenes associated with the matching genre. For example, if the genre map 202 for a particular content item 201 includes at least one action scene, the recommendation module 252 may recommend the content item 201 to a user determined to have a preference for the action genre. Still further, in some embodiments, the recommendation module 252 may determine the user's genre preferences based, at least in part, on the genre maps 202 stored in the genre map repository 240. For example, when analyzing the user's past viewing behavior, the recommendation module 252 may analyze the genre maps 202 associated with each content item 201 previously viewed by the user. The recommendation module 252 may thus determine the user's genre preferences based, at least in part, on the frequency of each genre appearing in the genre maps 202 associated with the user's viewing history.

The scene selection module 254 may enable a user to control the playback of media content based, at least in part, on the genre maps 202 stored in the genre map repository 240. For example, the scene selection module 254 may display a graphic user interface, via the output 203, through which the user may select a particular content item 201 and/or scene for playback. In some embodiments, the scene selection module 254 may tag or label each content item 201 with one or more associated genres using the genre map 202 associated with the content item 201. Thus, upon determining that a user wishes to watch only the action sequences in a selected content item 201 (e.g., as indicated via the user inputs 204), the scene selection module 254 may select (or skip to) one or more scenes of the content item 201 identified to contain an action sequence.

In some aspects, the scenes of a selected content item may be presented in a hierarchical order (e.g., for user selection). For example, the top level of the hierarchy may comprise a broader listing of genres (e.g., action, comedy, horror, etc.) and under each category may be a listing of one or more sub-genres (e.g., car chase, shoot out, heroic bloodshed, etc.). In some aspects, the scene selection module 254 may respond to user inputs 204 corresponding to the selection of a particular scene. For example, when the user selects a particular scene, the scene selection module 254 may jump to the location of that scene in the display content item 201. In some other aspects, the scene selection module 254 may allow the user to scan through the scenes associated with a particular genre in sequence. For example, the scene selection module 254 may respond to user inputs 204 by fast-forwarding to the next action sequence, or rewinding to the previous action sequence, in the displayed content item 201.

The content editing module 256 may edit or modify a selected content item 201 based, at least in part, on the associated genre map 202. In some embodiments, the content editing module 256 may dynamically insert other media (e.g., advertisements) into the timeline of the selected content item 201. For example, to avoid interrupting the flow of media content, the content editing module 256 may selectively insert advertisements during transitions between different genres (e.g., from an action scene to a comedy scene). In some other embodiments, the contenting editing module 256 may dynamically control the content of selected media based, at least in part, on the user's preferences. For example, the content editing module 256 may dynamically alter the media content (e.g., during playback) to prevent or limit the user's exposure to objectionable content.

In some aspects, the content editing module 256 may dynamically control the content of selected media by blocking out the objectionable content. For example, if a particular scene contains objectionable audio content (e.g., profanity, lewd language, etc.) the content editing module 256 may mute the audio content and/or suppress the subtitles when playing back that particular scene. If a particular scene contains objectionable video content (e.g., blood, gore, nudity, etc.), the content editing module 256 may black out the video when playing back that particular scene.

In some other aspects, the content editing module 256 may dynamically control the content of selected media by skipping over scenes containing objectionable content. For example, if a particular scene contains objectionable audio and/or video content, the content editing module 256 may avoid that particular scene (e.g., when playing back the media content) by jumping to the next scene that does not contain objectionable content. In other words, the content editing module 256 may effectively remove any scenes with objectionable content from the timeline of the media content.

In some other aspects, the content editing module 256 may dynamically control the content of selected media by obfuscating scenes containing objectionable content. For example, if a particular scene contains objectionable audio content, the content editing module 256 may reduce the volume level, mute the audio, or bleep out the audio content when playing back that particular scene. If a particular scene contains objectionable video content, the content editing module 256 may blur the video content (e.g., by deteriorating the resolution of the video frames or images) when playing back that particular scene.

Still further, in some aspects, the content editing module 256 may dynamically control the content of selected media by replacing or substituting the objectionable content with alternative ("safe") content. For example, if a particular scene contains objectionable audio content, the content editing module 256 may replace or substitute the audio content with alternative audio frames and/or subtitles that do not content such objectionable content (e.g., less profanity or lewd language) when playing back that particular scene. If a particular scene contains objectionable video content, the content editing module 256 may replace or substitute the video content with alternative video frames or images that do not contain such objectionable content (e.g., less violence or gore).

In some embodiments, the media playback interface 250 may determine a user's sensitivity towards certain types of objectionable content (e.g., violence, gore, horror, nudity, sex, etc.) based, at least in part, on one or more user inputs 204. For example, the user may specify which (if any) types of content the user considers objectionable or otherwise does not wish to view. The listing of objectionable content may be stored on the media device 200 as part of the user's preferences or personalization settings. Accordingly, the content editing module 256 may conditionally edit or alter the media content based on the user of the media device 200 at any given time. For example, when the media playback interface 250 detects a known user operating the media device 200 (e.g., via camera, microphone, fingerprint, or other biometric sensors), the content editing module 256 may edit out content deemed objectionable to that particular user.

In some other embodiments, the media playback interface 250 may determine a user's sensitivity towards certain types of objectionable content based, at least in part, on the user's age or demographic. For example, when implementing parental controls, the media device 200 may determine an age of the user based on visual and/or audio cues (e.g., facial features, physical size, vocal tone or pitch, etc.). Thus, when the media playback interface 250 detects a user matching a particular age or demographic operating the media device (e.g., via camera, microphone, or other user-identification inputs), the content editing module 256 may edit out content deemed objectionable or inappropriate to users of that particular age or demographic. For example, the content editing module 256 may dynamically edit out mature content (e.g., violence, gore, horror, nudity, sex, etc.) from any media presented to children.

Still further, in some embodiments, the media playback interface 250 may include a mechanism for overriding dynamic content controls (including parental controls). In some aspects, the override mechanism may be based on user inputs (including voice commands, gestures, and the like) from a particular user. For example, while implementing parental controls (e.g., dynamically controlling the playback of media content for children), the media playback interface 250 may detect an override command from a particular user. Upon determining that the override command matches one or more biometric signatures belonging to an adult (or any user with override authority), the media playback interface 250 may suspend the parental controls. In some implementations, the media playback interface 250 may temporarily suspend the dynamic content controls, in response to a valid override command, for a threshold duration (e.g., a user session).

In some embodiments, the media playback interface 250 may generate annotated content 205 based on the content items 201 and the genre maps 202. For example, the media playback interface 250 may use the genre map 202 associated with a content item 201 to add genre tags or labels to one or more scenes of the corresponding scenes of the content items 201. Accordingly, the annotated content 205 may be used to provide deep content genre-based media playback and/or recommendations on other media devices (such as media devices that may not have access to trained neural network models and/or machine learning architectures). In some aspects, the media device 200 may transmit the annotated content 205 to other media devices via the network interface 210.

In some other embodiments, the media device 200 may receive annotated content from other devices on the network (e.g., via the network interface 210). For example, the media device 200 may parse the content items 201 and the genre maps 202 from the received annotated content. As a result, the media device 200 may directly store the content items 201 and the associated genre maps 202 in the media content database 220 and genre map repository 240, respectively, without utilizing the neural network 230.

Figure 3:
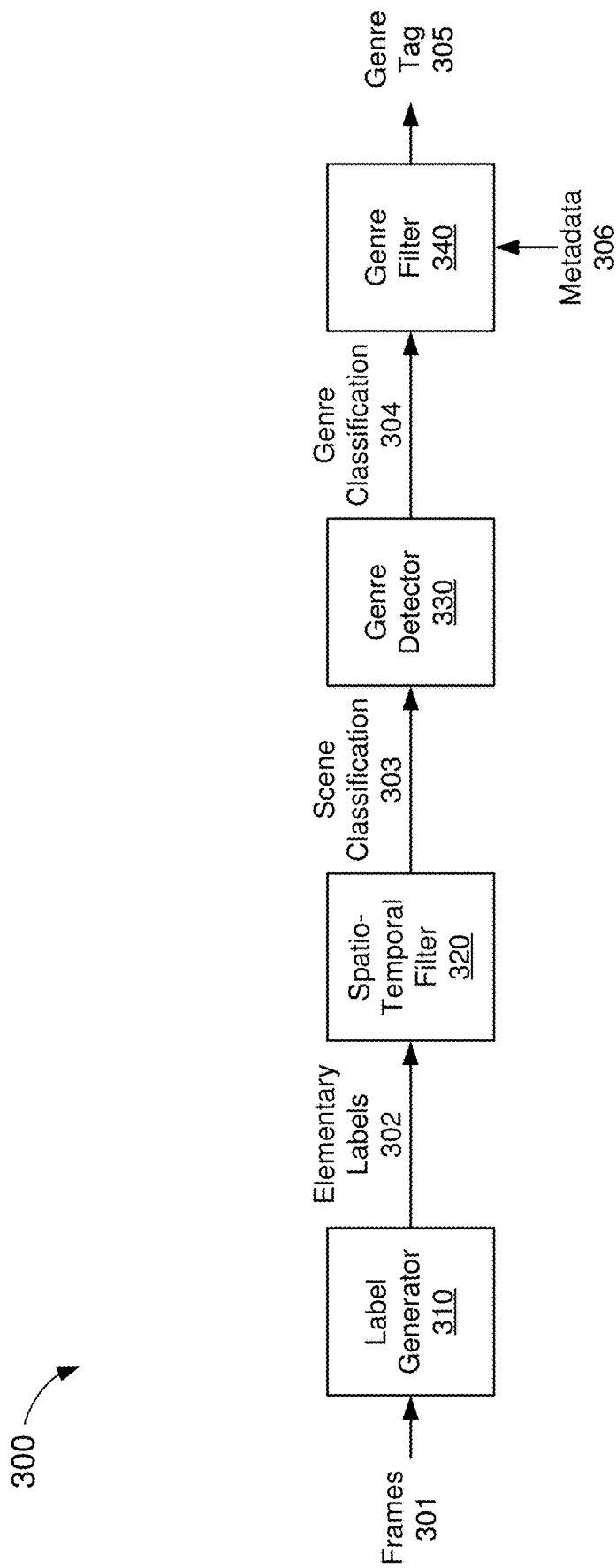
FIG. 3 shows a block diagram of a deep content genre tag generator for media content, in accordance with some embodiments.

FIG. 3 shows a block diagram of a deep content genre tag generator 300 for media content, in accordance with some embodiments. The genre tag generator 300 may be an example embodiment of the neural network 230 of FIG. 2. Accordingly, the genre tag generator 300 may generate one or more inferences about media content configured for playback on a media device. In some embodiments, the genre tag generator 300 may generate a genre tag 305 based on one or more frames 301 of a received content item. The genre tag generator 300 includes a label generator 310, a spatio-temporal filter 320, a genre detector 330, and a genre filter 340.

The label generator 310 receives one or more frames 301 of media content and generates one or more elementary labels 302, associated with pre-identified genres, for each frame. As described above, an elementary label may correspond to any object, feature, or characteristic that can be used to identify a particular genre of media content (e.g., blood, screams, tense music, etc.). In some embodiments, the label generator 310 may implement neural network models that are trained to detect one or more elementary labels in media content. It is noted that the combination of various media components (e.g., images, audio, optical flow, etc.) may be used to characterize a particular genre of media content. Thus, in some aspects, the frames 301 may include video frames (e.g., images), audio frames, and/or other media or data included in the receive content item.

The spatio-temporal filter 320 aggregates the elementary labels 302 over a threshold period or duration to create a scene classification 303. It is noted that certain genre-specific identifiers (such as a car chase or fight sequence) may span multiple frames of media content. Thus, in some embodiments, the spatio-temporal filter 320 may continuously aggregate the element labels 302 over a predetermined number (K) of frames 301. For example, each scene classification 303 may include one or more elementary labels 302 from the last K frames 301 of media content. In some other embodiments, the spatio-temporal filter 320 may aggregate the element labels 302 between consecutive scene transitions. For example, the spatio-temporal filter 320 may detect scene transitions and/or boundaries based, at least in part, on the continuity of video and/or audio data in consecutive frames 301 of media content and/or other information (e.g., metadata) included with the media content. Thus, each scene classification 304 may include one or more elementary labels 302 from each frame 301 of a given scene.

The genre detector 330 generates a genre classification 304 for each scene of the media content based, at least in part, on the scene classification 303. As described above, multiple genres may be inferred from the elementary labels 302 and/or scene classification 303 associated with a given set of frames. Thus, the genre detector 330 may use one or more neural network models to infer a probability or likelihood of the scene classification 303 matching each of a plurality of pre-identified genres. In some embodiments, the genre detector 330 may select the best match among the possible genres that may be identified from each scene classification 303. For example, the genre classification 304 may indicate or identify the genre having the highest probability or likelihood of being associated with a given scene. In some other embodiments, the genre detector 330 may associated multiple genres with any given scene. For example, the genre classification 304 may indicate or identify any genres with a non-zero likelihood of being associated with a given scene.

The genre filter 340 may fine-tune the genre classification 304 to produce a corresponding genre tag 305. In some embodiments, the genre filter 340 may use genre classifications 304 from one or more previous and/or subsequent scenes to further refine the genre information associated with the current scene. For example, if the preceding scene and the subsequent scene have a high probability of being a horror scene, the genre filter 340 may introduce additional bias for the current scene to be identified as a horror scene. Thus, if the current scene has a relatively equal probability of being classified as either an action scene or a horror scene based on the genre classification 304, the genre filter 340 may label the current scene a horror scene (e.g., in the corresponding genre tag 305) based, at least in part on the genre classifications 304 for the adjacent scenes.

In some other embodiments, the genre filter 340 may use metadata 306 provided with the media content to further refine the genre information associated with the current scene. Example metadata 306 may include (but is not limited to) title, genre, actors, director, release date, runtime, news, and/or other information about the selected content item. For example, if the scene contains actors that are well-known for action roles, the genre filter 340 may introduce additional bias for the current scene to be identified as an action scene. Thus, if the current scene has a relatively equal probability of being classified as either an action scene or a horror scene based on the genre classification 3034, the genre filter 340 may label the current scene an action scene (e.g., in the corresponding genre tag 305) based, at least in part, on the metadata 306.

Figure 4:
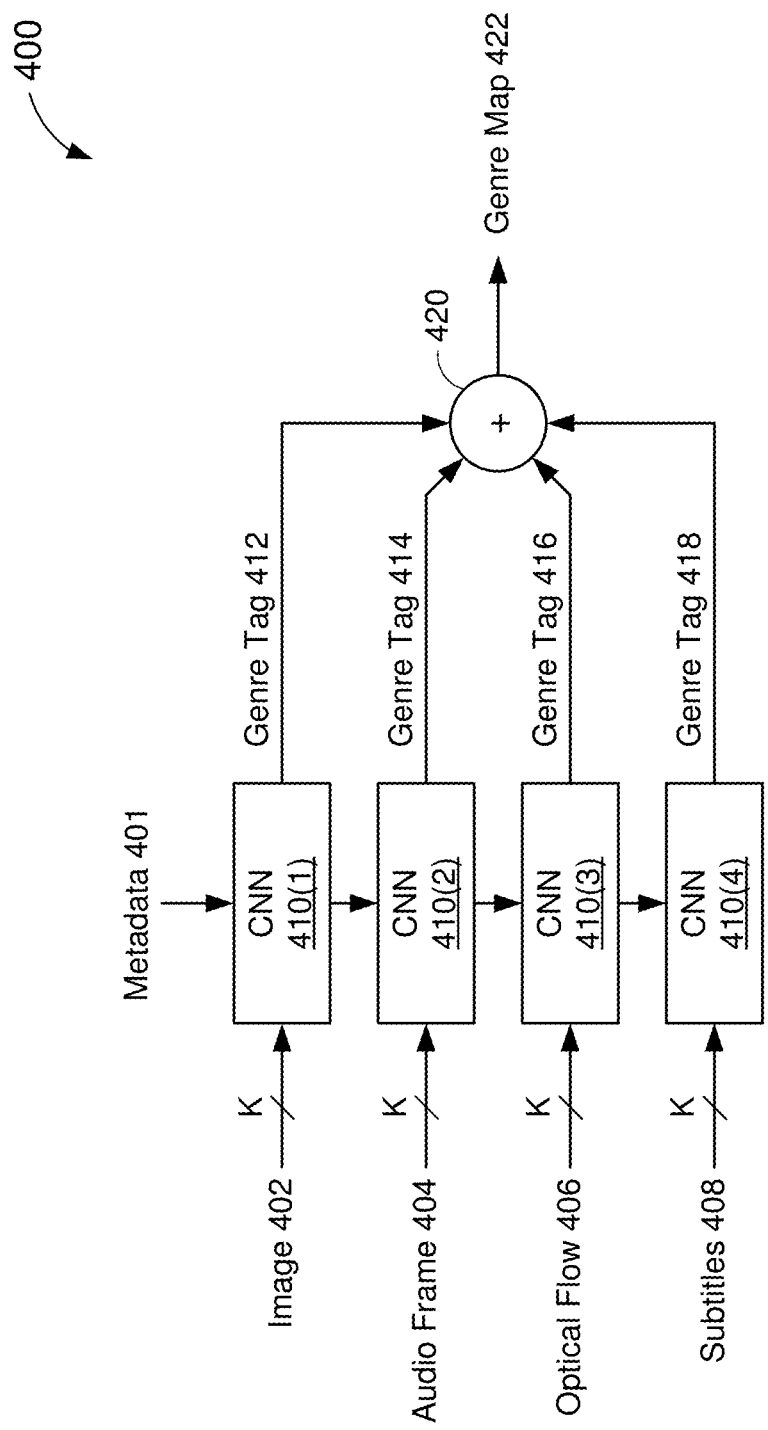
FIG. 4 shows an example neural network architecture that can be used for generating genre inferences about media content, in accordance with some embodiments.

FIG. 4 shows an example neural network architecture 400 that can be used for generating genre inferences about media content, in accordance with some embodiments. The neural network architecture 400 may be an example embodiment of the neural network 230 of FIG. 2. Accordingly, the neural network architecture 400 may generate one or more inferences about media content configured for playback on a media device. In some embodiments, the neural network architecture 400 may generate a genre map 430 based on one or more frames of a received content item. The neural network architecture 400 includes a plurality of convolutional neural networks (CNNs) 410(1)-410(4) and an aggregator 420.

The CNNs 410(1)-410(4) are configured to infer genre information from a number (K) of frames of media content. For example, each of the CNNs 410(1)-410(4) may be an example embodiment of the deep content genre tag generator 300 of FIG. 3. Thus, each of the CNNs 410(1)-410(4) may generate a respective genre tag 412-418 based on a different media component 402-408 of the K frames. In the example of FIG. 4, the neural network architecture 400 is shown to produce a genre map 422 based on four media components 402-408. However, in actual implementations the neural network architecture 400 may generate the genre map 422 based on any number of media components. For example, the neural network architecture 400 may include fewer or more CNNs than those depicted in FIG. 4. As described with respect to FIG. 3, one or more of the CNNs 410(1)-410(4) may be configured to fine-tune its respective genre tag using metadata 401 provided with the media content.

The first CNN 410(1) may generate a first genre tag 412 based on a number (K) of images 402 of the received content item. The images 402 may include pixel data to be displayed (e.g., as video content) over the duration of the K frames. The second CNN 410(2) may generate a second genre tag 414 based on a number (K) of audio frames 404 of the received content item. The audio frames 404 may include audio data to be output (e.g., as audio content) over the duration of the K frames. The third CNN 401(3) may generate a third genre tag 416 based on an optical flow 406 of the K frames. The optical flow information 406 may describe the motion (e.g., velocity) of objects and/or pixels, across multiple images 402, over the duration of the K frames. The fourth CNN 410(4) may generate a fourth genre tag 418 based on one or more subtitles 408 associated with the K frames. The subtitles 408 may include a transcription of the audio content output over the duration of the K frames.

As described with respect to FIG. 3, each of the genre tags 412-418 may identify one or more genres that can be associated with the K frames. It is noted, however, that different genre tags 412-418 may indicate different genres for the K frames. For example, the first CNN 410(1) may determine that a given set of K frames is most likely associated with an action scene (e.g., based on the images 402), while the second CNN 410(2) may determine that the same set of K frames is most likely associated with a horror scene (e.g., based on the audio frames 404). In some embodiments, the aggregator 420 may generate the genre map 422 based on a combination of the genre tags 412-418 output by the different CNNs 410(1)-410(4).

In some aspects, the aggregator 420 may select the highest-probability genre, among the genre tags 412-418, to be included in the genre map 422. For example, if the first and third CNNs 410(1) and 410(3) determine that a given set of K frames is most likely associated with an action scene (e.g., based on the images 402 and optical flow 406), the second CNN 410(2) determines that the given set of K frames is most likely associated with a horror scene (e.g., based on the audio frames 404), and the fourth CNN 410(4) determines that the given set of K frames is most likely associated with a dramatic scene, the genre map 422 may indicate that the given set of K frames is associated with an action scene.

In some other aspects the aggregator 420 may select the highest-probability genre, from each of the genre tags 412-418, to be included in the genre map 422. For example, if the first and third CNNs 410(1) and 410(3) determine that a given set of K frames is most likely associated with an action scene (e.g., based on the images 402 and optical flow 406), the second CNN 410(2) determines that the given set of K frames is most likely associated with a horror scene (e.g., based on the audio frames 404), and the fourth CNN 410(4) determines that the given set of K frames is most likely associated with a dramatic scene, the genre map 422 may indicate that the given set of K frames is associated with an action scene, a horror scene, and a dramatic scene.

FIG. 4 depicts an example neural network architecture 400 in which the genre map 422 is generated by aggregating individual genre tags 412-418 produced by respective CNNs 410(1)-410(4). However, other neural network architectures are also contemplated without deviating from the scope of this disclosure. For example, in some other implementations, each of the CNNs 410(1)-410(4) may be configured to detect one or more features (e.g., elementary labels) based on the respective data inputs 402-408. The outputs (e.g., features) of each of the CNNs 410(1)-410(4) may be provided as inputs to another neural network which generates the genre map 422 based on the combination of features. Still further, in some implementations, the genre map 422 may be generated by a single neural network that receives the raw data 402-408 as its inputs. For example, the feature detection and/or genre tagging may be performed by one or more intermediate layers of the neural network.

Figure 5:
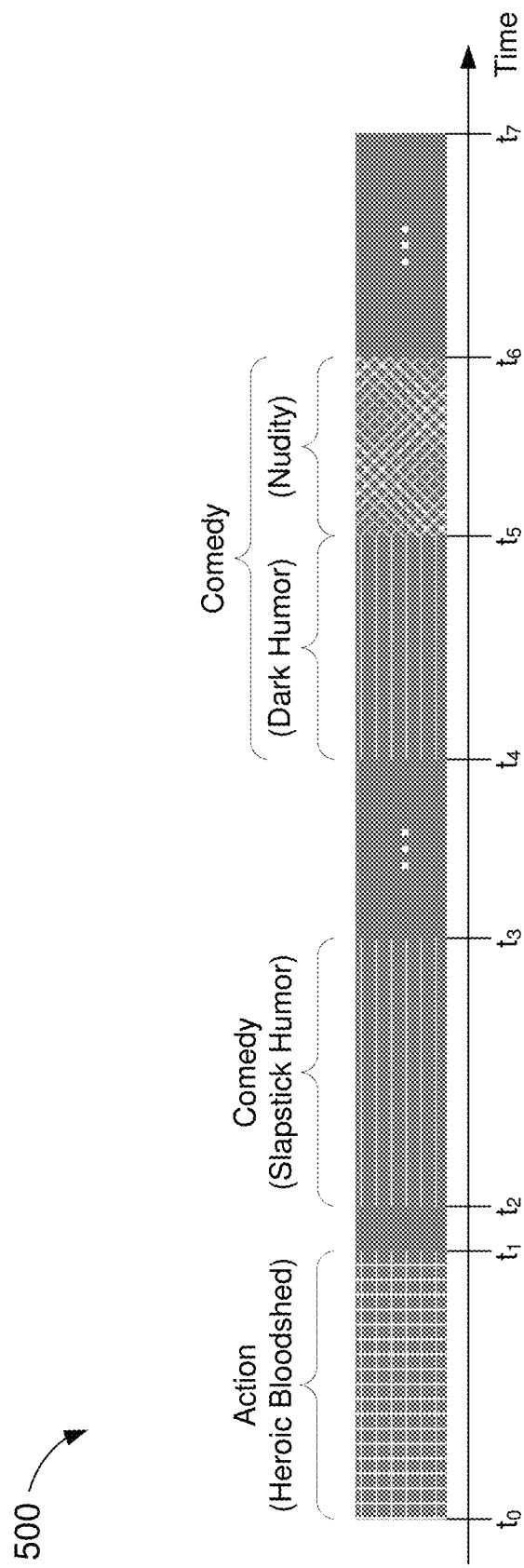
FIG. 5 shows an example genre map that can be generated for a media content item, in accordance with some embodiments.

FIG. 5 shows an example genre map 500 that can be generated for a media content item, in accordance with some embodiments. In the example of FIG. 5, the genre map 500 is depicted as a timeline spanning the duration of the content item (e.g., from times $t_0$ to $t_7$).

As shown in FIG. 5, the content item includes an action scene from times $t_0$ to $t_1$, a comedic scene from times $t_2$ to $t_3$, and another comedic scene from times $t_4$ to $t_6$. In some embodiments, the genre information may include more detail about the specific type of genre (e.g., sub-genre) associated with each scene. For example, the action scene (e.g., from times $t_0$ to $t_1$) may contain heroic bloodshed, the first comedic scene (e.g., from times $t_2$ to $t_3$) may contain slapstick humor, and the second comedic scene (e.g., from times $t_4$ to $t_6$) may contain dark humor and nudity.

In some embodiments, the scenes may be further broken down or labeled with finger granularity. For example, the second comedic scene contains dark humor from times $t_4$ to $t_5$ and further contains nudity from times $t_5$ to $t_6$. Accordingly, the second comedic scene may be further subdivided into two comedic scenes, including a comedic scene with dark humor (e.g., form times $t_4$ to $t_5$) and a comedic scene with nudity (e.g., from times $t_5$ to $t_6$). Thus, if a user of the media device wishes to avoid nudity, the media device may skip over or otherwise filter only the portion of the second comedic scene that contains nudity (e.g., from times $t_5$ to $t_6$). In this manner, the user may enjoy watching the remainder of the media content without having to worry about content the user may deem offensive.

Figure 6:
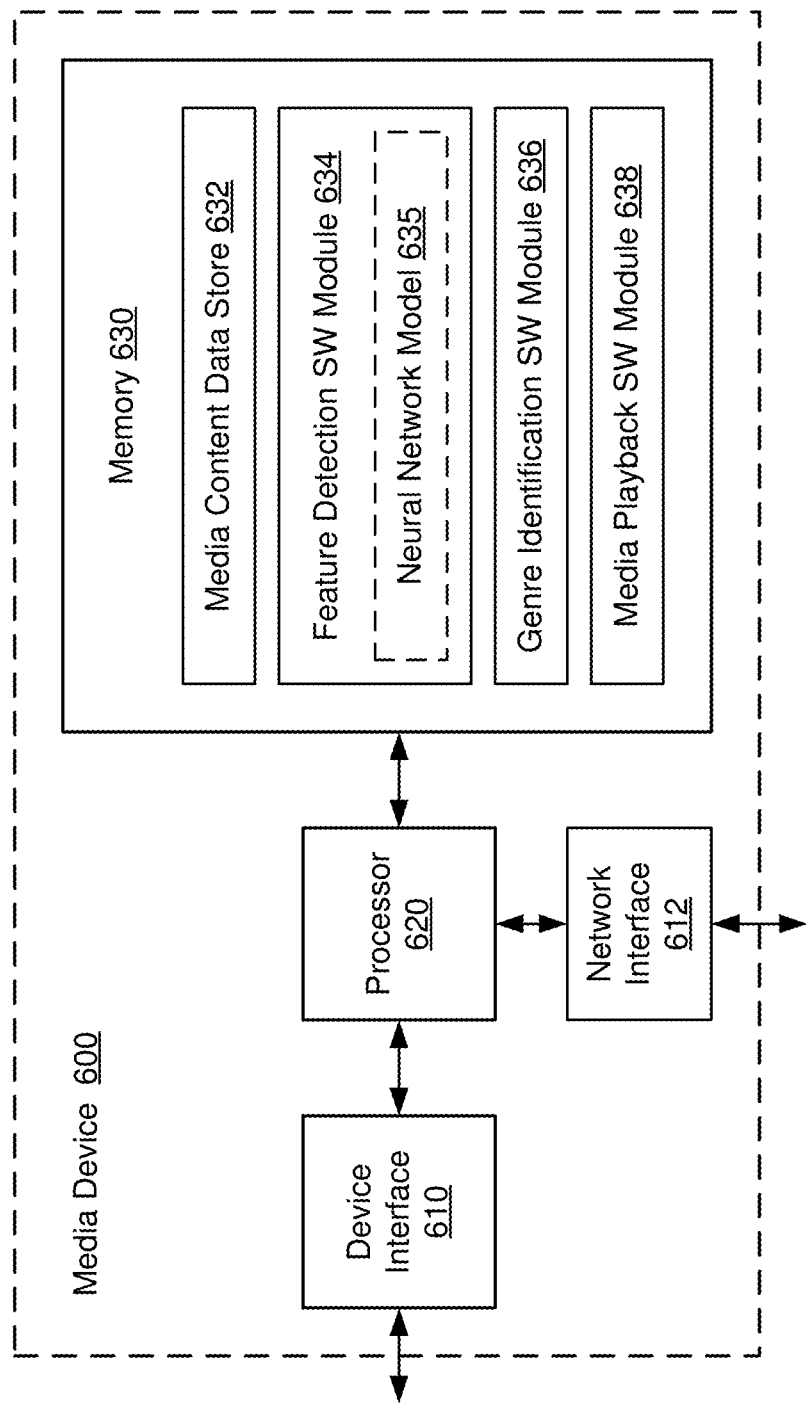
FIG. 6 shows another block diagram of a media device, in accordance with some embodiments.

FIG. 6 shows another block diagram of a media device 600, in accordance with some embodiments. The media device 600 may be an example embodiment of the media device 110 and/or media device 200 described above with respect to FIGS. 1 and 2, respectively. The media device 600 includes a device interface 610, a network interface 612, a processor 620, and a memory 630.

The device interface 610 may be used to communicate with one or more input sources and/or output sources coupled to the media device 600. Example input sources may include, but are not limited to, cameras, microphones, buttons, keyboards, mice, touchpads, fingerprint scanners, photosensors, accelerometers, gyroscopes, and the like. For example, the device interface 610 may transmit signals to, and receive signals from, the input sources to receive user inputs from a user of the device 600. Example output sources may include, but are not limited to, speakers, displays, lights, and the like. For example, the device interface 610 may transmit signals to, and receive signals from, the output sources to output information and/or media content to the user of the device 600. The network interface 612 may be used to communicate with a network resource external to the media device 600 (e.g., the content delivery networks 120 of FIG. 1). For example, the network interface 612 may receive media content from the network resource.

The memory 630 includes a media content data store 632 to store media content received via the network interface 612. For example, the media content data store 632 may buffer a received content item for playback by the media device 600. The memory 630 may also include a non-transitory computer-readable medium (e.g., one or more nonvolatile memory elements, such as EPROM, EEPROM, Flash memory, a hard drive, etc.) that may store at least the following software (SW) modules:
- a feature detection SW module 634 to detect one or more objects or features in one or more frames of a content item using a neural network model 635;
- a genre identification SW module 636 to identify one or more genres associated with the one or more frames based at least in part on the detected objects or features; and
- a media playback SW module 638 to control playback of the content item based at least in part on the identified genres.

Each software module includes instructions that, when executed by the processor 620, cause the media device 600 to perform the corresponding functions. The non-transitory computer-readable medium of memory 630 thus includes instructions for performing all or a portion of the operations described below with respect to FIGS. 7 and 8.

Processor 620 may be any suitable one or more processors capable of executing scripts or instructions of one or more software programs stored in the media device 600. For example, the processor 620 may execute the feature detection SW module 634 to detect one or more objects or features in one or more frames of a content item using a neural network model 635. The processor 620 may also execute the genre identification SW module 636 to identify one or more genres associated with the one or more frames based at least in part on the detected objects or features. Still further, the processor 620 may execute the media playback SW module 638 to control playback of the content item based at least in part on the identified genres.

Figure 7:
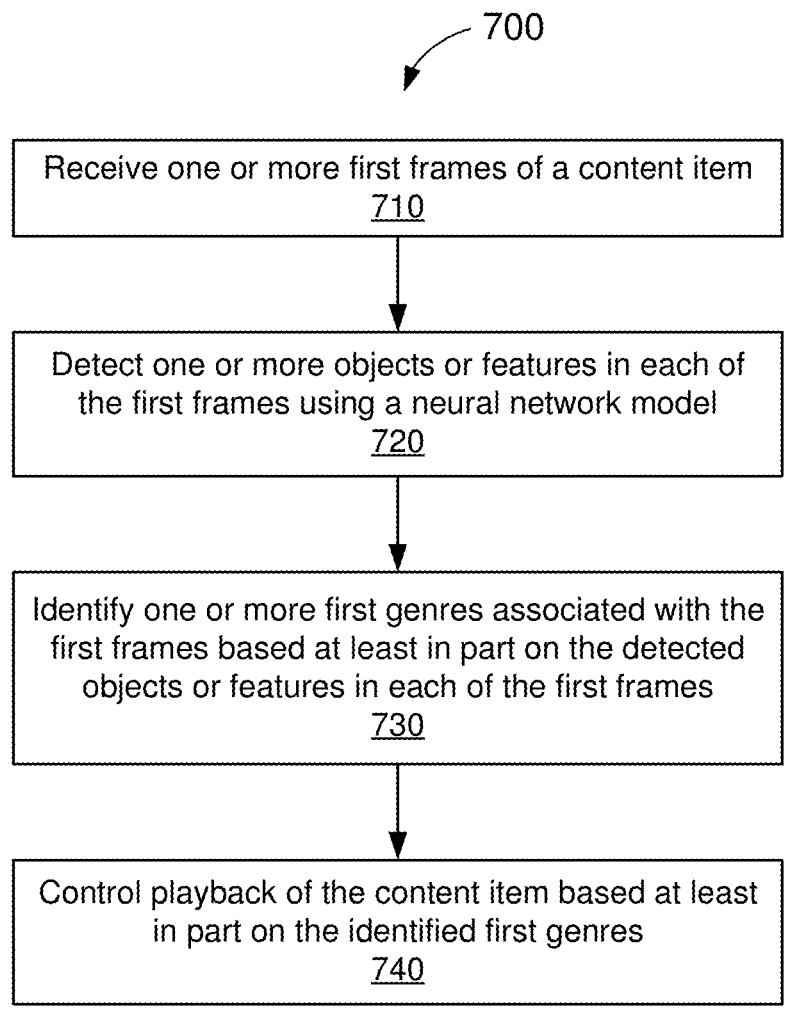
FIG. 7 shows an illustrative flowchart depicting an example operation for playing back media content, in accordance with some embodiments.

FIG. 7 shows an illustrative flowchart depicting an example operation 700 for playing back media content, in accordance with some embodiments. The example operation 700 can be performed by a media device such as, for example, the media device 110 of FIG. 1 and/or the media device 200 of FIG. 2.

The media device receives one or more first frames of a content item (710). For example, the media device may receive the content item from one or more content delivery networks. The content item may include audio and/or video associated with live, interactive, or pre-recorded media content (e.g., movies, television shows, video games, music, and the like). In some implementations, the received content item may be categorized into one or more genres or classifications (e.g., action, horror, comedy, science fiction, drama, reality, country, hip hop, rock and roll, etc.). The received content item may be stored or buffered for subsequent (or immediate) playback.

The media device detects one or more objects or features in each of the first frames using a neural network model (720). In some embodiments, the media device may implement one or more neural network models to detect one or more elementary labels associated with the content items. As described above, elementary label may correspond to any object, feature, or characteristic that can be used to identify a particular genre of media content. For example, horror movies often contain scenes with blood, screams, and/or tense music. Thus, in order to identify a scene as a horror scene, the neural network model may be trained to recognize or infer blood (e.g., from received video frames), screams (e.g., from received video and/or audio frames), and tense music (e.g., from receive audio frames) in the received content items.

The media device identifies one or more first genres associated with the first frames based at least in part on the detected objects or features in each of the first frames (730). As described above, a unique combination of elementary labels (e.g., blood, screams, tense music, etc.) may describe a particular genre of media content (e.g., horror). However, the set of elementary labels associated with two different genres may not be mutually exclusive. For example, blood is a feature that is commonly associated with action and horror genres. Thus, in some instances, multiple genres may be inferred from the elementary labels associated with a given set of frames. In some embodiments, the media device may select the best match among the possible genres that may be identified from the set of elementary labels. In some other embodiments, the media device may associate multiple genres with any given scene.

The media device controls playback of the content item based at least in part on the identified first genres (740). In some embodiments, the media device may enable a user to select (or skip to) scenes one or more scenes that match a particular genre. In some other embodiments, the media device may edit or modify selected media content based, at least in part, on the genre information. In some embodiments, the media device may dynamically insert other media (e.g., advertisements) into the timeline of the selected media content. Still further, in some embodiments, the media device may dynamically filter scenes containing objectionable content (e.g., violence, gore, horror nudity, sex, etc.) to avoid exposing the user to such objectionable content.

Figure 8:
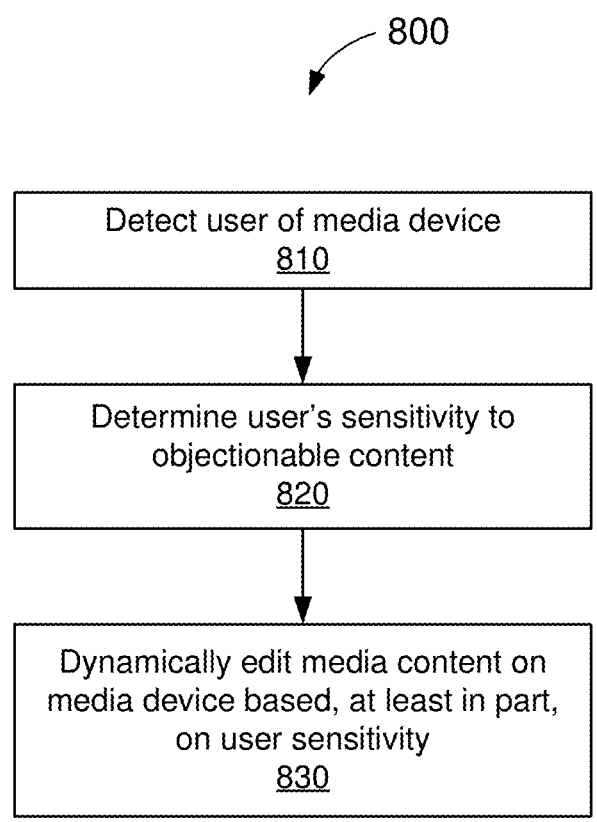
FIG. 8 shows an illustrative flowchart depicting an example operation for dynamic content control, in accordance with some embodiments.

FIG. 8 is an illustrative flowchart depicting an example operation 800 for dynamic content control, in accordance with some embodiments. The example operation 800 can be performed by a media device such as, for example, the media device 110 of FIG. 1 and/or media device 200 of FIG. 2. More specifically, the operation 800 may be used to selectively filter or avoid presenting media content that a user of the media device considers objectionable or offensive.

The media device may detect a user currently operating the media device (810). In some embodiments, the media device may detect the user based on one or more user inputs. For example, the user may select his or her user profile or enter a set of login credentials that uniquely identifies the user of the media device. In some other embodiments, the media device may detect the user using one or more sensors (e.g., camera, microphone, fingerprint, or other biometric sensors). For example, in some aspects, the media device may use facial recognition, voice recognition, and/or fingerprint recognition to match the user to a database of known users. In some other aspects, the media device may use information from the one or more sensors to determine the user's age or demographic group. For example, the media device may determine the age of the user based on visual and/or audio clues (e.g., facial features, physical size, vocal tone or pitch, etc.).

The media device may further determine the user's sensitivity to certain types of objectionable content (820). In some embodiments, the media device may determine a user's sensitivity towards certain types of objectionable content (e.g., violence, gore, horror, nudity, sex, etc.) based, at least in part, on one or more user preferences. For example, the user may specify which (if any) types of content the user considers objectionable or otherwise does not wish to view. The listing of objectionable content may be stored on the media device as part of the user's preferences or personalization settings. In some other embodiments, the media device may determine a user's sensitivity towards certain types of objectionable content based, at least in part, on the user's age or demographic. More specifically, the media device may be preconfigured to determine that certain types of content are generally inappropriate for audiences of a particular age or demographic. For example, media content intended for mature audiences (e.g., including violence, gore, horror, nudity, sex, etc.) is generally considered inappropriate for children.

The media device may then dynamically edit media content on the media device based, at least in part, on the user sensitivity (830). In some embodiments, the media device may dynamically control the content of selected media, when playing back media content, to prevent or limit the user's exposure to objectionable content. In some aspects, the media device may dynamically control the content of selected media by blocking out the objectionable content. In some other aspects, the media device may dynamically control the content of selected media by skipping over scenes containing objectionable content. In some other aspects, the media device may dynamically control the content of selected media by obfuscating scenes containing objectionable content. Still further, in some aspects, the media playback interface 116 may dynamically control the content of selected media by replacing or substituting the objectionable content with alternative ("safe") content.

In some other embodiments, the media device may dynamically edit media content based, at least in part, on contextual information. For example, in some aspects, the media device may edit out content that is predetermined to be objectionable for a particular age or demographic group (e.g., children) when the media device detects a user belonging to that group. In some other aspects, the media device may dynamically edit media content from a particular source or origin (e.g., production studio, broadcast station, content distribution network, or other content provider). For example, if the user is sensitive to nudity, the media device may disable the streaming, retrieval, or playback of media content from one or more content providers known for nudity in their content. Still further, in some aspects, the media device may dynamically edit media content during one or more predetermined time periods. For example, if the user is child, the media device may disable all streaming, retrieval, or playback of media content (e.g., from any content provider) during specific times when the child should not be watching media content (e.g., school nights).

Still further, in some embodiments, the media device may dynamically control user inputs or requests for media content based on the sensitivity of the user. For example, voice-enabled devices provide hands-free operation by listening and responding to a user's voice. A user may query a voice-enabled device for information (e.g., recipes, instructions, directions, and the like), to playback media content (e.g., music, videos, audiobooks, and the like), or to control various home-automation devices (e.g., lights, thermostats, garage doors, and the like). Some voice-enabled devices may communicate with one or more network (e.g., cloud computing) resources to interpret and/or generate a response to the user's voice query. However, aspects of the present disclosure recognize that it may be undesirable to send voice queries from certain users (e.g., based on their age or demographic) to an external network.

In some aspects, the media device may prevent user inputs from being sent to an external network when the user belongs to a particular age or demographic group. For example, when the media device detects that the user is a child, the media device may prevent the user's voice queries from being sent to an external network. In some other aspects, the media device may return a "safe response" to the user's query to a particular age or demographic group. For example, when the media device detects that the user is a child, the media device may filter or curate the results of the user's voice queries to ensure that the results do not contain any objectionable content. Still further, in some aspects, the media device may selectively control user inputs during specific time periods (e.g., nights, weekdays, etc.) or for content originating from particular sources (e.g., production studio, broadcast station, content distribution network, or other content providers).

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Further, those of skill in the art will appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the disclosure.

The methods, sequences or algorithms described in connection with the aspects disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor.

In the foregoing specification, embodiments have been described with reference to specific examples thereof. It will, however, be evident that various modifications and changes may be made thereto without departing from the broader scope of the disclosure as set forth in the appended claims. The specification and drawings are, accordingly, to be regarded in an illustrative sense rather than a restrictive sense.

What is claimed is:

1. A method of playing back media content, comprising:
receiving a sequence of frames of a content item, the sequence of frames spanning a duration associated with a plurality of scenes in the content item;
detecting one or more objects or features in each frame in the sequence based on a neural network model;
identifying a respective genre associated with each of the plurality of scenes in the content item based at least in part on the detected objects or features in each frame in the sequence;
generating a genre map associated with the plurality of scenes in the content item, wherein the genre map includes a timeline and a mapping of each of the identified genres to a respective portion of the timeline associated with one of the plurality of scenes;
detecting a genre transition based on differences between the genre associated with a first scene of the plurality of scenes and the genre associated with a second scene of the plurality of scenes, wherein the second scene immediately follows the first scene in the timeline;
modifying the content item to include additional media content between the first scene and the second scene based at least in part on the detected genre transition; and
playing back the modified content item.

2. The method of claim 1, wherein the one or more objects or features are detected based on at least one of an image, audio, optical flow, or subtitle component of each frame in the sequence.

3. The method of claim 1, further comprising:
generating recommendations for other media content based at least in part on the genre map.

4. The method of claim 3, further comprising:
determining an overall genre for the content item based at least in part on the genre map, wherein the recommendations include only media content having an overall genre that matches the overall genre of the content item.

5. The method of claim 1, further comprising:
selectively initiating playback at one or more frames of the content item based at least in part on the genre map.

6. The method of claim 1, wherein the modifying of the content item further comprises:
dynamically jumping to or skipping one or more frames of the content item based at least in part on the genre map.

7. The method of claim 1, wherein the modifying of the content item further comprises:
detecting a user initiating the playback of the content item;
determining one or more preferences of the user; and
dynamically editing the content item based at least in part on the genre map and the one or more preferences of the user.

8. The method of claim 7, wherein the dynamically editing comprises:
identifying objectionable content in the plurality of scenes in the content item based at least in part on the one or more preferences of the user; and
filtering the objectionable content from the content item.

9. The method of claim 7, wherein the dynamically editing comprises:
determining an age or demographic group of the user, wherein the editing of the content item is further based on the age or demographic group of the user.

10. The method of claim 7, wherein the dynamically editing comprises:
determining a source or origin of the content item, wherein the editing of the content item is further based on the source or origin of the content item.

11. The method of claim 7, wherein the dynamically editing comprises:
determining a time at which the user initiates the playback of the content item, wherein the editing of the content item is further based on the time at which the user initiates the playback of the content item.

12. A media device, comprising:
processing circuitry; and
memory storing instructions that, when executed by the processing circuitry, cause the media device to:
receive a sequence of frames of a content item, the sequence of frames spanning a duration associated with a plurality of scenes in the content item;
detect one or more objects or features in each frame in the sequence based on a neural network model;
identify a respective genre associated with each of the plurality of scenes in the content item based at least in part on the detected objects or features in each frame in the sequence;
generate a genre map associated with the plurality of scenes in the content item, wherein the genre map includes a timeline and a mapping of each of the identified genres to a respective portion of the timeline associated with one of the plurality of scenes;
detect a genre transition based on differences between the genre associated with a first scene of the plurality of scenes and the genre associated with a second scene of the plurality of scenes, wherein the second scene immediately follows the first scene in the timeline;
modify the content item to include additional media content between the first scene and the second scene based at least in part on the detected genre transition; and
playback the modified content item.

13. The media device of claim 12, wherein execution of the instructions for modifying the content item further causes the media device to:
detect a user initiating the playback of the content item;
determine one or more preferences of the user; and dynamically edit the content item based at least in part on the genre map and the one or more preferences of the user.

\* \* \* \* \*